United States Patent
Moriyama et al.

[11] Patent Number: 5,900,807
[45] Date of Patent: May 4, 1999

[54] COLLISION DETECTION DEVICE

[75] Inventors: Hiroshi Moriyama; Hiroyuki Sada, both of Niihari-gun, Japan

[73] Assignee: Sensor Technology Co., Ltd., Kobe, Japan

[21] Appl. No.: 08/894,711

[22] PCT Filed: Mar. 5, 1996

[86] PCT No.: PCT/JP96/00522

§ 371 Date: Oct. 14, 1997

§ 102(e) Date: Oct. 14, 1997

[87] PCT Pub. No.: WO96/27514

PCT Pub. Date: Sep. 12, 1996

[30] Foreign Application Priority Data

Mar. 7, 1995 [JP] Japan .................................. 7-077212

[51] Int. Cl.⁶ .................................................. B60Q 1/00
[52] U.S. Cl. .................... 340/436; 180/282; 280/735; 307/10.1; 701/45; 701/46
[58] Field of Search ................. 340/436; 701/46, 701/45; 180/282; 280/735, 734; 73/488; 307/10.1

[56] References Cited

U.S. PATENT DOCUMENTS

| | | | |
|---|---|---|---|
| 5,173,614 | 12/1992 | Woehrl et al. | 180/282 |
| 5,189,311 | 2/1993 | Moriyama et al. | 307/10.1 |
| 5,202,831 | 4/1993 | Blackburn et al. | 180/282 |
| 5,247,466 | 9/1993 | Shimada et al. | 73/488 |
| 5,587,906 | 12/1996 | McIver et al. | 280/735 |
| 5,608,628 | 3/1997 | Drexler et al. | 701/45 |
| 5,610,817 | 3/1997 | Mahon et al. | 701/46 |
| 5,740,041 | 4/1998 | Iyoda | 280/735 |

*Primary Examiner*—Jeffery A. Hofsass
*Assistant Examiner*—John Tweel, Jr.
*Attorney, Agent, or Firm*—Oblon, Spivak, McClelland, Maier & Neustadt, P.C.

[57] ABSTRACT

The collision detection device for appropriately actuating two or more types of passenger safety devices (5,6,7,8) which are installed on a vehicle and respectively have different performances depending on collision types such as a front collision and a side collision, and comprising two acceleration sensors (S1,S2) installed respectively in different directions and a controller for selecting appropriate passenger safety devices to be actuated from said plurality of passenger safety devices in accordance with a direction of a collision when recognizing the collision on the basis of accelerations detected by the two acceleration sensors, and for actuating them, said controller (4) having collision detecting axes related with said passenger safety devices respectively, said collision detecting axes preset in directions assumed as directions for detecting the collision which are front, right and left directions and further at least one additional directions which are different from said front, right and left directions, said controller (4) which arithmetically obtains components (G1,G2,G3,G4,G5) of an acceleration concerning the collision along said collision detecting axes on the basis of the two accelerations (Gx, Gy) detected by said acceleration sensors (S1,S2), and selects suitable passenger safety devices from said plurality of passenger safety devices (5,6,7,8) related with the collision detecting axes on the basis of the components (G1,G2,G3, G4,G5), then actuates them.

4 Claims, 6 Drawing Sheets

COLLISION DETECTION DEVICE

TECHNICAL FIELD

This invention relates to a vehicle collision detection device, especially for actuating passenger safety devices in accordance with a direction of a collision.

BACKGROUND OF THE INVENTION

There is a collision detection device which detects front and side collisions of a vehicle respectively and then actuates air bags for front and side collisions respectively. In this collision detection device, acceleration data detected in three directions, namely front, right and left directions, by acceleration sensors installed in the longitudinal and lateral directions are individually treated then air bags for front and side collisions are respectively actuated. And there is a further proposed collision detection device of which a utilization range is expanded to an oblique collision and which avoids an inflation of a side air bag at the time of a front collision, wherein acceleration informations in the three directions are composed and treated as a composite vector (Refer to Japanese Laid Open No.H6-55993 and H6-56000).

Figure 6:
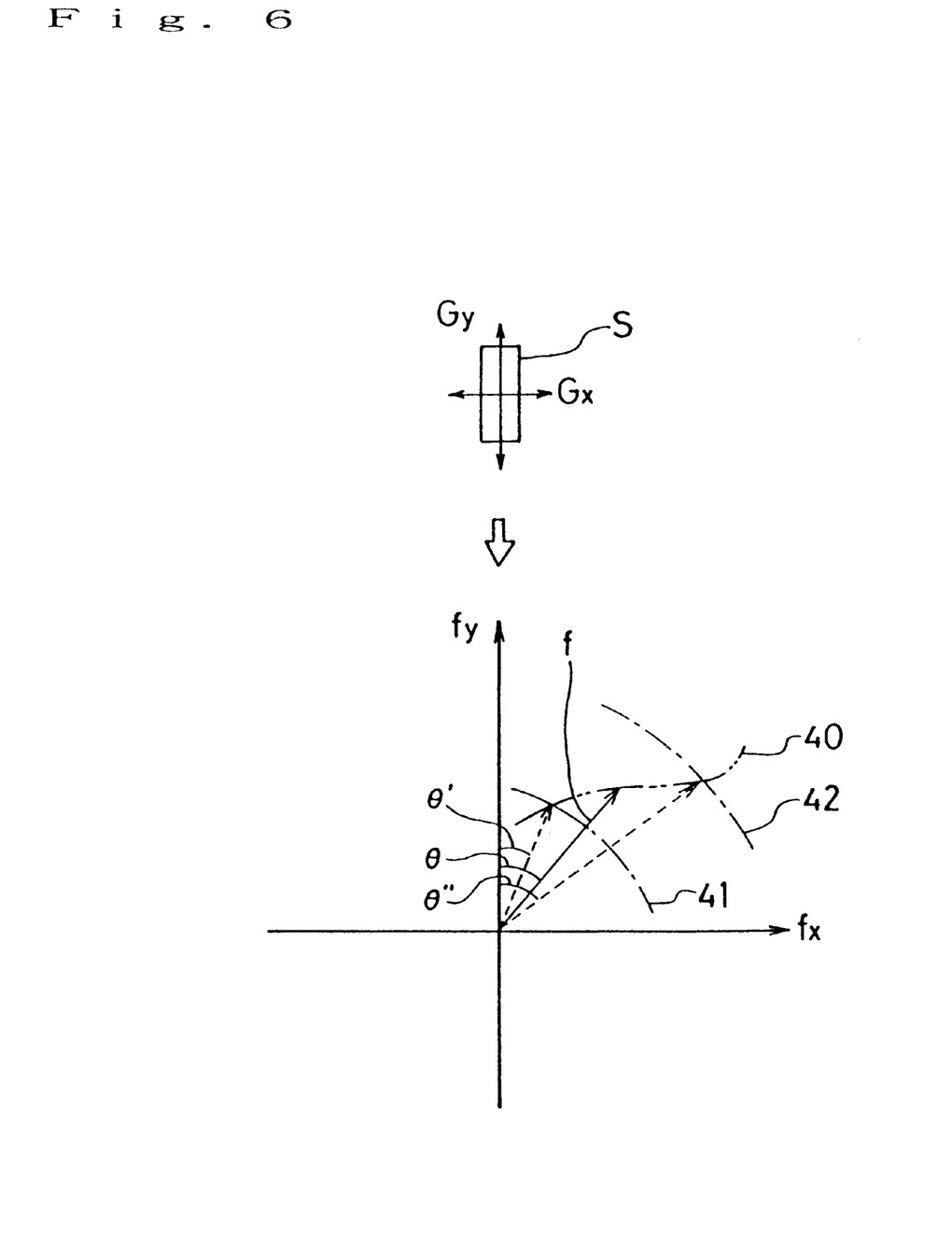
FIG. 6 is a vector diagram showing a collision detecting method of a conventional collision detection device.

In more detail, this device detects accelerations Gy and Gx in longitudinal and lateral directions respectively as shown in FIG. 6 and obtains values fy and fx by integrating the accelerations Gy and Gx with respect to time. Then, the values fy and fx are composed as a composite vector $\underline{f}$ concerning the collision. Concretely, a magnitude of the collision is calculated according to a formula of $(fx^2+fy^2)^{1/2}$, and the direction of the collision is calculated according to a formula of $\theta=\tan^{-1}(fx/fy)$.

And a threshold value is set for the magnitude The necessities of actuations concerning air bags are judged from a result of a comparison between the threshold value and the magnitude. Further, an air bag to be inflated is selected according to the direction $\theta$.

However, the actual collision situation is so complicated that not only the magnitude but also the direction of the collision as shown by the above vector $\underline{f}$ change every moment. For example, we assume that an end of the vector $\underline{f}$ changes along a chain double-dashed line 40 as shown in the drawing. In this case, a definition of the direction $\theta$, $\theta'$ or $\theta''$ depends on a way of setting threshold value 41, or 42. Consequently, there is a problem in which combinations of the magnitudes and the directions of the vector $\underline{f}$ are so innumerable that the way of setting threshold value becomes complicated.

This invention is made to solve these problems possessed by the conventional art, and the object of the present invention is offering a collision detection device which can actuate suitable passenger safety devices after selecting them from a plurality of passenger safety devices even when not only the magnitude but also the direction concerning acceleration of a collision change every moment.

THE DISCLOSURE OF INVENTION

The collision detection device of this invention actuates appropriately two or more types of passenger safety devices which are installed on a vehicle and respectively have different performances depending on collision types such as a front collision and a side collision. And it comprises two acceleration sensors installed in different directions respectively and a controller for selecting and actuating suitable passenger safety devices from the plurality of passenger safety devices according to a direction of a collision when recognizing the collision on the basis of each acceleration detected by the two acceleration sensors. The controller has collision detecting axes related with the plurality of passenger safety devices respectively. The collision detecting axes are preset in such directions as the collision could be detected in. For example, the directions are the longitudinal, right and left directions and further at least one additional direction which is different from the aforesaid longitudinal, right and left directions. The controller arithmetically obtains components along each of the collision detecting axis with respect to the two accelerations detected by the acceleration sensors, and selects suitable passenger safety devices from the plurality of passenger safety devices related with the collision detecting axes on the basis of the each components, then actuates the suitable passenger safety devices.

More concretely, the collision detection device of this invention comprises, a plurality of passenger safety devices arranged in a vehicle, a first acceleration sensor for detecting acceleration in a longitudinal (front-rear) direction of the vehicle, a second acceleration sensor for detecting acceleration in a lateral (left-right) direction of the vehicle, collision detecting axes which are assumed as the directions in which the collision will be detected and which are preset in the front, right and left directions and in at least one additional direction which is different from the aforesaid front, right and left directions, a first calculator for calculating components along the collision detecting axes with respect to each acceleration detected by the first and second sensors then summing up these components along every collision detecting axis so as to calculate each component of acceleration along the each collision detecting axis concerning the real collision;

a second calculator for arithmetically obtaining each referential value referring to the each component of the acceleration along every collision detecting axis concerning the real collision on the basis of the components of the acceleration concerning the real collision, and a comparator for comparing the each referential value with each threshold value preset for the each collision detecting axis and for transmitting an actuating signal to the passenger safety device related with the collision detecting axis when the referential value exceeds the threshold value on the collision detecting axis.

Further it is preferable that the two acceleration sensors are installed in the longitudinal (front-rear) and lateral (left-right) directions of the vehicle respectively.

And the comparator has a plurality of blocks corresponding to a plurality of groups consisting of one or more of the aforementioned passenger safety devices. And the threshold values are preset in the blocks of the comparator respectively. Further, in the block, the threshold value is compared with one referential value or a sum of the plurality of referential values which are input to the block.

And the other comparator is acceptable, which has a plurality of blocks corresponding to a plurality of groups consisting of one or more of the passenger safety devices. And, each threshold value is preset in the each block. Further, in the block, the threshold value is compared with the referential value which is input to the block. Then the suitable passenger safety devices can be selected and actuated through AND or OR circuit.

According to the collision detection device of the present invention having the above-mentioned construction, the accelerations detected by the acceleration sensors installed in the two different directions are respectively resolved into the components along the collision detecting axes. With respect to the components of the accelerations detected by the acceleration sensors, the components are summed up about every collision detecting axis so that each component of acceleration concerning the real collision can be obtained along each collision detecting axis. In practical, the summed up values about every collision detecting axis are respectively integrated with respect to time. These are regarded as referential values referring to the components of the acceleration concerning the real collision. And the passenger safety devices related with the collision detecting axes are actuated on the basis of the referential values.

In this case, the threshold values can be easily established since the threshold values are preset for the fixed collision detecting axes respectively. Accordingly, the collision is detected so far as the components along the collision detecting axes exceed the threshold values respectively. And the suitable passenger safety device related with the collision detecting axes are selected and actuated even if the magnitude and the direction of the acceleration concerning the real collision change in a complicated way. And also the components of the acceleration concerning the real collision can be easily calculated along the collision detecting axes because they are obtained by multiplying the accelerations detected by the acceleration sensors with certain coefficients respectively. Further, a sensitivity to an oblique collision is improved in comparison with the conventional art in which a collision is detected only in the front, right and left directions because the collision detection device of the present invention is provided with collision detecting axes in the oblique directions in addition to the collision detecting axes in the front, right and left directions of the vehicle.

And further, in case that the two acceleration sensors are installed in the longitudinal and lateral directions of the vehicle respectively, the installation directions of the acceleration sensors make a right angle with each other and overlap with the front-rear collision detecting axis and the right-left collision detecting axis respectively. Accordingly, it is not necessary to calculate the components of the accelerations along these collision detecting axes. Consequently, the construction of the collision detection device becomes simple.

And in case one threshold value is prepared for the one referential value or sum of the referential values referring to the components of the acceleration in the comparator, one referential value of one component along one collision detecting axis is added to another referential value of another component along another collision detecting axis and then a result of the addition is evaluated. Therefore, the collision occurred in a direction between one collision detecting axis and another collision detecting axis can be assuredly detected.

Also in case the threshold values are prepared for the referential values referring to the components of the acceleration respectively and AND or OR circuits are prepared then the suitable passenger safety devices are selected and actuated through AND or OR circuits, not only one referential value of one component along one collision detecting axis but also another referential value of another component along another collision detecting axis are evaluated. Therefore, the collision occurred in a direction between one collision detecting axis and another collision detecting axis can be assuredly detected.

Thus, the collision detection device of the present invention having the above-mentioned construction is not such a collision detection device as selects and actuates passenger safety devices on the basis of a judgement only from the magnitude of acceleration $(fx^2+fy^2)^{1/2}$ and the direction $\theta=\tan^{-1}(fx/fy)$ concerning a collision. The collision detection device of the present invention is what calculates components of accelerations detected by two acceleration sensors along collision detecting axes then selects and actuates suitable passenger safety devices related with the collision detecting axes on the basis of the components along the collision detecting axes. Accordingly, even if not only the magnitude but also the direction of the collision acceleration change every moment, the suitable passenger safety devices can be selected from two or more types of passenger safety devices and then they can be actuated.

Consequently, the collision detection device can detect the direction of the collision and actuate passenger safety devices most suitable for the collision direction in spite of a simple construction.

THE BEST EMBODIMENT OF THE INVENTION

Figure 1:
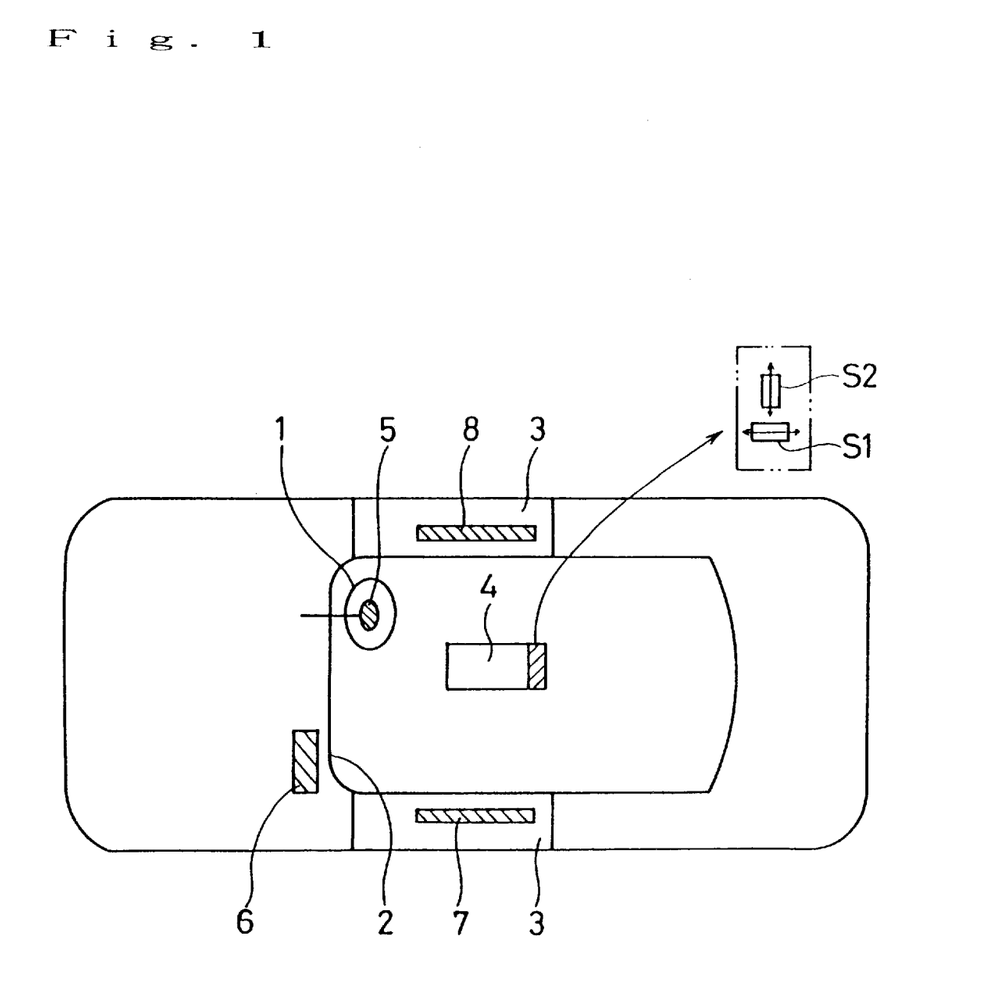
FIG. 1 is a plane view showing an arrangement of the collision detection device of this invention.
Figure 3:
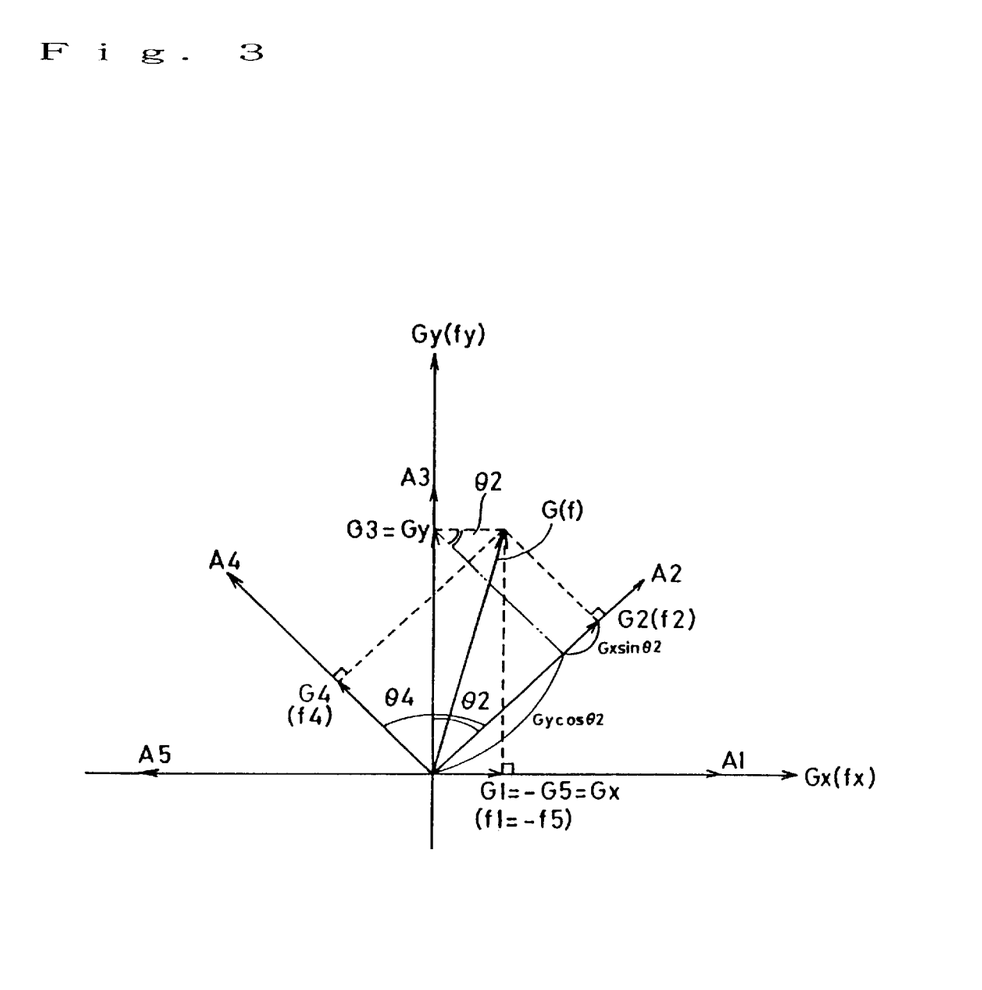
FIG. 3 is a vector diagram showing an arrangement of collision detecting axes in this invention.
Figure 4:
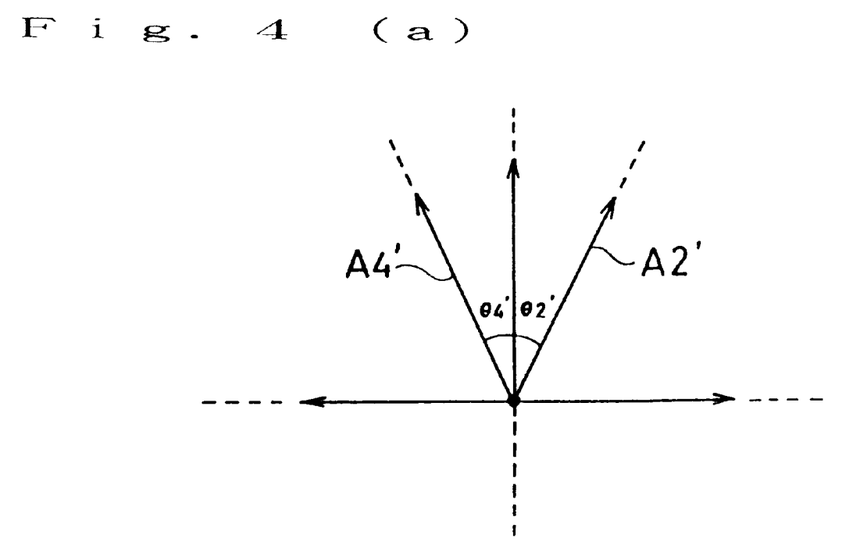
FIG. 4(a) and FIG. 4(b) are vector diagrams showing modification examples of the collision detecting axes in this invention.

The embodiment of this invention will be described below referring to the drawings. FIG. 1 is a plane view showing an arrangement of the collision detection device of this invention, FIG. 2 is a block diagram showing a control system, FIG. 3 is a vector diagram showing an arrangement of collision detecting axes, FIG. 4(a) and FIG. 4(b) are vector diagrams showing modification examples of the collision detecting axes.

Firstly, the construction will be described. In FIG. 1, passenger safety devices are arranged. An air bag 5 for driver's seat is arranged at the middle of steering wheel 1, an air bag 6 for front passenger's seat is arranged inside an instrument panel 2 and side air bags 7 and 8 are arranged inside right and left side doors 3 respectively. The air bag 5 for driver's seat and the air bag 6 for front passenger's seat are for a collision occurring at a front of the vehicle and the side air bags are for a collision occurring at a side of the vehicle. And, pretensioners or the like are sometimes prepared for the front collision. Further, a controller 4 and first and second acceleration sensors S1 and S2 are arranged at the middle of the vehicle. The first and second acceleration sensors S1 and S2 include piezo-electric elements and the like and are arranged in the longitudinal (front-rear) and lateral (left-right) directions of the vehicle so as to detect the accelerations in each direction then transmit them as electrical signals. It is possible to replace these acceleration sensors S1 and S2 with one sensor which can detect the acceleration in both directions.

Figure 2:
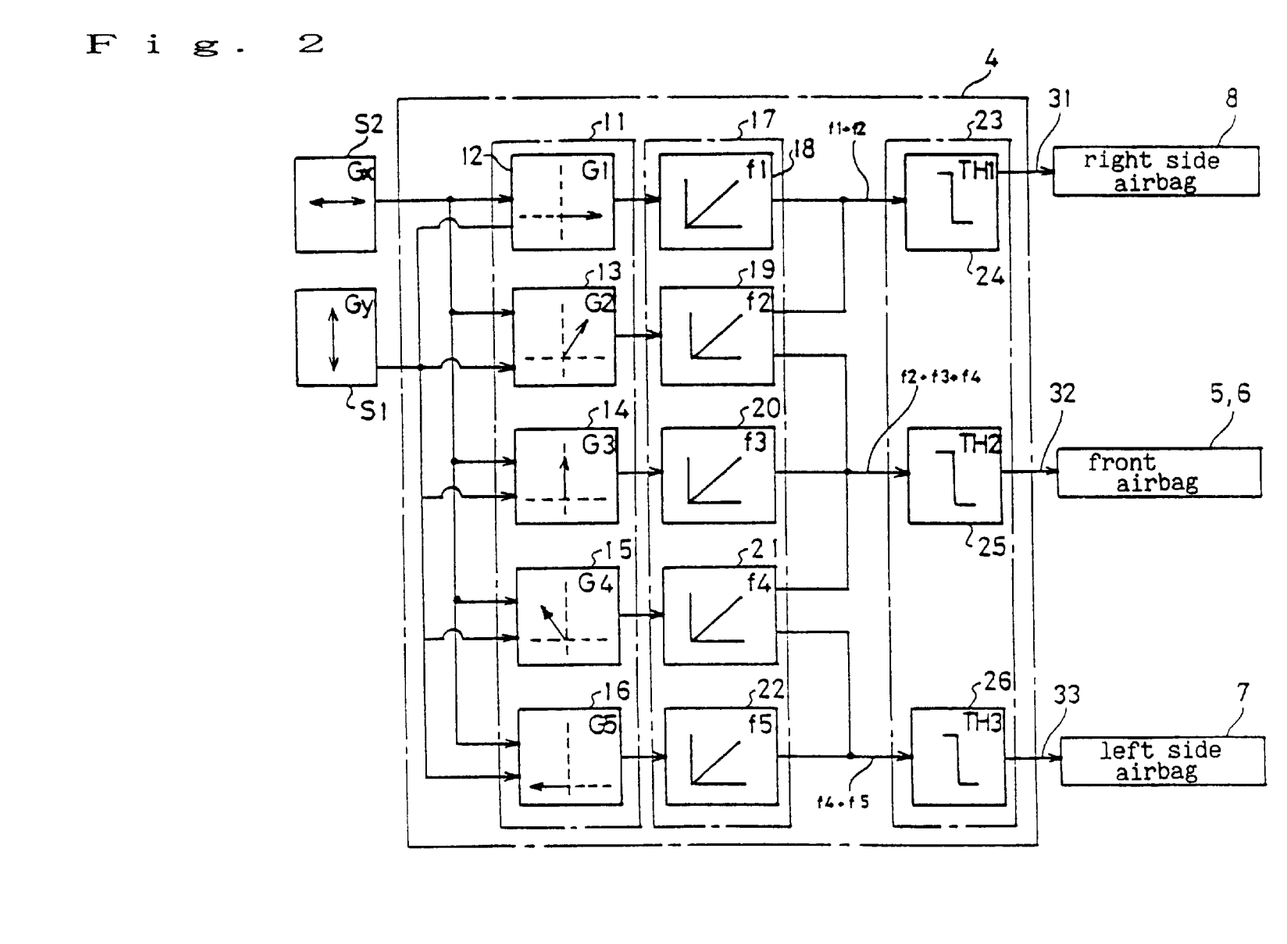
FIG. 2 is a block diagram showing a control system of the collision detection device of this invention.

In FIG. 2, accelerations Gy and Gx in the longitudinal and lateral directions of the vehicle respectively detected by the first and second acceleration sensors S1, S2 are input into the controller 4 consisting of such a CPU as has an arithmetic unit then processed there. When a collision is detected, actuation signals 31–33 are transmitted to the front collision air bags 5, 6 and the right and left side air bags 7, 8 respectively.

Secondly, a construction of the controller 4 will be described. In blocks 12–16 constructing a first calculator 11, components G1–G5 of the acceleration concerning the collision are respectively calculated along the collision detecting axes A1–A5 as shown in FIG. 3 on the basis of the accelerations Gy and Gx.

In FIG. 3, the collision detecting axes A1–A5 are respectively set in the right direction A1, the right oblique direction A2, the front-rear direction A3, the left oblique direction A4 and the left direction A5.

Next, FIG. 2 will be described again. In blocks 18–22 constructing a integrating means 17 which corresponds to a second calculator for arithmetically obtaining referential values referring to the components of the acceleration, first-order time integration values f1–f5 concerning the components G1–G5 are arithmetically obtained. In addition, second-order time integration values can be also made instead of these first-order time integration values. The first-order time integration values represent speeds and the second-order time integration values represent displacements.

A comparator pointed out with a numeral 23 has blocks 24, 25, 26 which are respectively prepared for the right side air bag 8, the front air bags 5, 6 and the left side air bag 7. And, in case of an oblique collision, it is necessary to actuate the front air bags 5,6, the side air bags 7,8 or both front and side air bags 5,6,7,8. Therefore, the time integration value f2 along the right oblique collision detecting axis A2 is input to the both blocks 24,25 and the time integration value f4 along the left oblique collision detecting axis A4 is input to the both blocks 25,26. And in the blocks 24–26, the following arithmetic process are made. Namely, in the block 24, the sum of time integration values f1 and f2 obtained respectively in the blocks 18 and 19 is compared with the predetermined threshold value TH1 then the actuation signal 31 is transmitted to the right side air bag 8 provided that the sum of time integration values f1 and f2 exceeds the threshold value TH1. In the block 25, the sum of time integration values f2–f4 obtained respectively in the blocks 19–21 is compared with the predetermined threshold value TH2 then the actuation signal 32 is transmitted to the front air bags 5,6 provided that the sum of time integration values f2–f4 exceeds the threshold value TH2. In the block 26, the sum of time integration values f4, f5 obtained respectively in the blocks 21 and 22 is compared with the predetermined threshold value TH3 then the actuation signal 33 is transmitted to the left side air bag 7 provided that the sum of time integration values f4, f5 exceeds the threshold value TH3.

Next, calculation contents in the blocks 12–16 will be described in detail referring to FIG. 3. In FIG. 3, x-axis and y-axis are sometimes used for explaining the accelerations and sometimes used for explaining the time integration values. As shown in FIG. 3, the collision detecting axes A1–A5 are respectively set in the right direction A1, the right oblique direction A2, the front-rear direction A3, the left oblique direction A4 and the left direction A5. The right oblique collision detecting axis A2 and the left oblique collision detecting axis A4 slant from the front-rear collision detecting axis A3 with angles $\theta 2$ and $\theta 4$ respectively ($\theta 4 = -\theta 2$, $\theta 2 = 45°$ in such an example as shown in FIG. 3). And, the components of the accelerations Gy, Gx along the collision detecting axes A1–A5 are, for example, calculated as follows. When an arbitrary acceleration $\underline{G}$ occurs as shown in the drawing, the component G1 along the collision detecting axis A1 corresponds to the value of acceleration Gx, namely G1=Gx. And the component G5 along the collision detecting axis A5 corresponds to the value of –G1, namely G5=–G1. The component G3 along the collision detecting axis A3 corresponds to the value of acceleration Gy, namely G3=Gy. The component G2 along the collision detecting axis A2 corresponds to the value of G2=Gy cos $\theta 2$+Gx sin $\theta 2$ as shown in the drawing. In the same way, the component G4 along the collision detecting axis A4 corresponds to the value of G4=Gy cos $\theta 4$+Gx sin $\theta 4$(=Gy cos $\theta 2$–Gx sin $\theta 2$). Here, when calculating G2 and G4, predetermined proper weighting factor can be used instead of the above-mentioned sine and cosine.

Now, it will be described in detail referring to FIG. 2 how to set the threshold values TH1–TH3 in the blocks 24–26 respectively. The threshold values TH1–TH3 are set, for example, under the following condition. Firstly, the threshold values TH1–TH3 are set as small as the collision along the collision detecting axes A1–A5 can be detected. For example, the threshold values TH1,TH2,TH3 are set so that the time integration values f1,f3,f5 concerning components of accelerations of collisions occurring along the collision detecting axes A1, A3, A5 may respectively fulfill formulas of f1>TH1, f3>TH2 and f5>TH3. Whereby, the collisions occurring along the collision detecting axes A1, A3, A5 are detected respectively.

Secondly, the time integration value f2 concerning the component of acceleration along the right oblique collision detecting axis A2 is input into two blocks 24, 25 in order to compare with threshold values TH1, TH2. Also, the time integration value f4 concerning the component of acceleration along the left oblique collision detecting axis A4 is input into two blocks 25, 26 in order to compare with threshold values TH2, TH3. Therefore, collisions occurring between the collision detecting axes A1 and A3 or between the collision detecting axes A3 and A5 are detected to add the time integration values f2, f4 to the time integration values f1, f3, f5 respectively. Accordingly, the threshold value TH2 should be set in as large as the front air bags 5, 6 can not be actuated by the addition between the time integration values f2, f4 and the time integration values f1, f3, f5 when a collision occurs in a direction very close to the right-left direction. Also, the threshold values TH1, TH3 should be set in as large as the side air bags 7, 8 can not be actuated by the addition between the time integration values f2, f4 and the time integration values f1, f3, f5 when a collision occurs in a direction very close to the front-rear direction. For example, the threshold value TH1 is set so as to fulfill a formula f1+f2 <TH1 when a collision occurs in a direction very close to the front-rear direction. Hereon, the oblique collision detecting axes A2 and A4 work as boundaries for a judgement whether or not one direction in which a collision occurs is very close to the front-rear direction or the left-right direction. The threshold values are properly selected in the range which satisfies the above two conditions. In addition, the threshold values TH1–TH3 can be weighted considering shock absorption capacity of the vehicle in the collision.

Next, performance of the above-mentioned collision detection device will be described referring to FIG. 2 and FIG. 3. In FIG. 2 and FIG. 3, for example, when a collision having acceleration G occurs as shown in FIG. 3, accelerations Gy and Gx are detected by the first and second acceleration sensors S1, S2. Time integration values f1–f5 concerning components of acceleration G along the collision detecting axes A1–A5 are calculated on the basis of the accelerations Gy and Gx.

And in the block 25 of the comparator 23, an actuating signal 32 is output towards the front air bags 5,6 when a sum of the time integration values f2, f3,f4 exceeds or is equal to threshold value TH2, then the front air bags 5, 6 are inflated by receiving the actuating signal 32. On the other hand, in the block 24, a sum of the time integration values f1, f2 is under the threshold value TH1 because the collision is occurred in a direction very close to the front direction. Accordingly, the actuating signal is not transmitted to the right side air bag 8 so as to be never inflated. And also, in the block 26, a sum of the time integration values f4, f5 is under the threshold value TH3 because the value of f5 is negative. Accordingly, the actuating signal is not transmitted to the left side air bag 7 so as to be never inflated. Hereon, a description concerning a case of an occurrence of a collision having acceleration G in another direction is omitted because it could be similar to the above-mentioned description.

Thus, according to the collision detection device of the present invention, appropriate airbags relative to such a direction as corresponds to the direction in which the collision occurs are selected from the air bags arranged in the vehicle by the simple arithmetic processes then actuated.

Next, modification will be described referring to FIG. 4(a) and FIG. 4(b). As shown in FIG. 4(a), when the angles θ2', θ4' between the oblique collision detecting axes A2', A4' and the front-rear collision detecting axis are reduced from 45° respectively, an oblique collision occurring in an oblique direction close to the front can be emphatically detected. And, as shown in FIG. 4(b), when a further collision detecting axis A6 is prepared in a rearward direction and a further air bag for a rear collision is prepared on a head rest of a vehicle, the collision detection device of the present invention can detect the rear collision. Thus, the collision detecting axes can be set with various numbers and various directions.

The more the number of the collision detecting axes is increased, the more the direction and magnitude of the collision can be exactly judged. Then, appropriate passenger safety devices can be actuated.

It is preferable for pretensioners to be actuated with actuations of the air bags in order to obtain a certain safety of passengers. In this case, the pretensioners are actuated for all of front, side and rear collisions.

Figure 5:
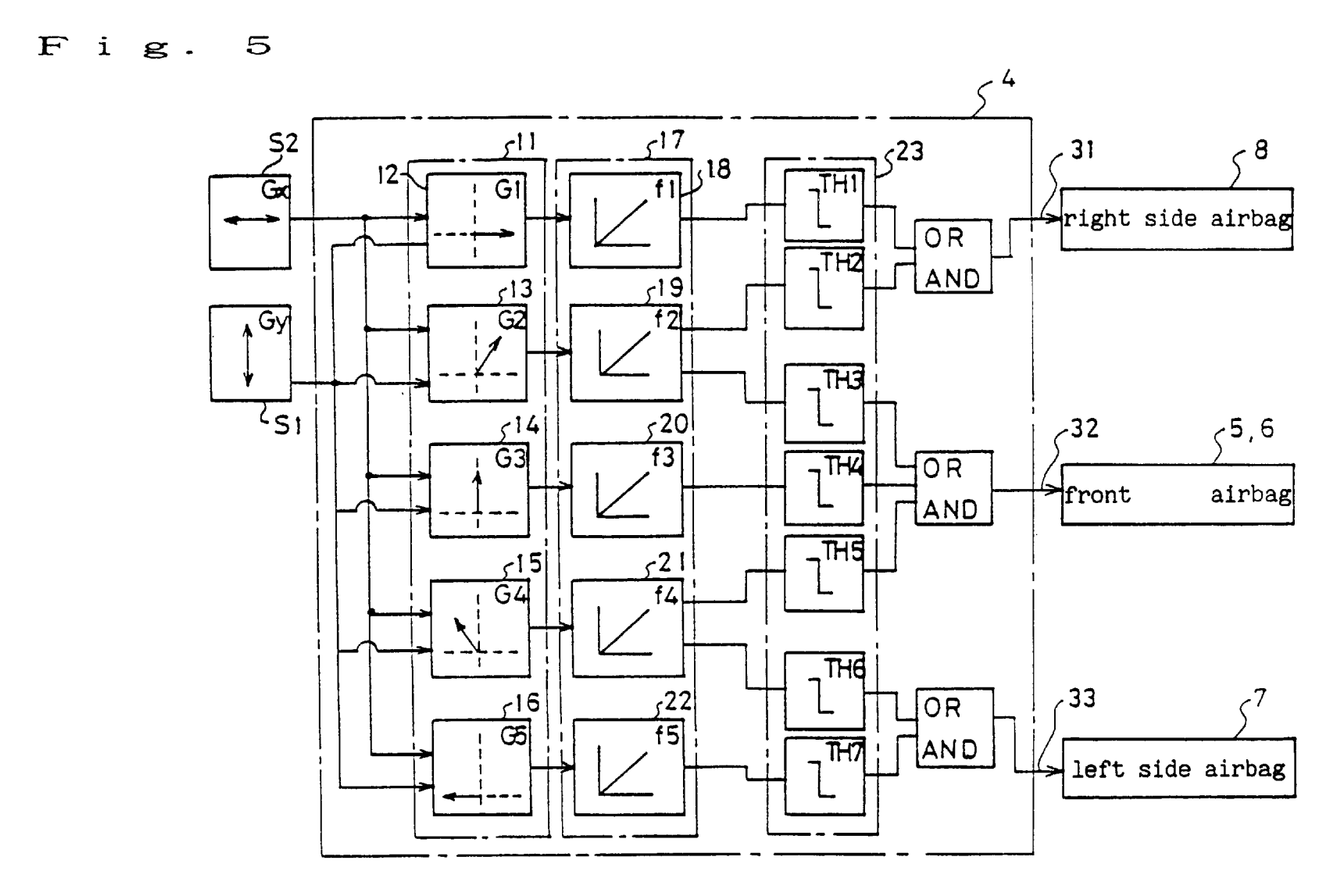
FIG. 5 is a block diagram showing another control system of this invention.

In the above-mentioned embodiment in FIG. 2, the threshold values TH1–TH3 of the comparator 23 are prepared for the sum of the time integration values concerning components of acceleration along the collision detecting axes. Instead of the above-mentioned embodiment in FIG. 2, the threshold values TH1–TH7 of the comparator 23 may be respectively prepared for the time integration values f1–f5 concerning components of acceleration along the collision detecting axes as shown in FIG. 5 so as to compare time integration values f1–f5 with the threshold values TH1–TH7 respectively. In this case, actuation signals as results of the comparisons are transmitted to air bags 5–8 through OR or AND circuits. In this embodiment in FIG. 5, the same effect as the above-mentioned embodiment in FIG. 2 can be obtained.

POSSIBILITIES OF INDUSTRIAL APPLICATION

The collision detection device of the present invention is suitable as a collision detection device which can select appropriate passenger safety devices from a plurality of passenger safety devices then actuates them. Because the present invention calculates components of an acceleration concerning the collision along collision detecting axes on the basis of accelerations detected by first and second sensors and selects appropriate passenger safety devices from the plurality of passenger safety devices relative to the collision detecting axes then actuates them.

We claim:

1. The collision detection device for actuating appropriately two or more types of passenger safety devices which are installed on a vehicle and respectively have different performances depending on collision types such as a front collision and a side collision, and comprising a first acceleration sensor for detecting acceleration in a front-rear direction of the vehicle, a second acceleration sensor for detecting acceleration in a left-right direction of the vehicle, a controller for selecting appropriate passenger safety devices to be actuated from said plurality of passenger safety devices in accordance with a direction of a collision when recognizing the collision on the basis of accelerations detected by the two acceleration sensors, and for actuating them, said controller which has at least five collision detecting axes which are respectively preset in front, right and left directions and further in right oblique, left oblique directions between the front-rear direction and the left-right direction, and which arithmetically obtains components of an acceleration concerning the collision along the said collision detecting axes on the basis of the accelerations detected by said acceleration sensors and selects suitable passenger safety devices from said plurality of passenger safety devices related with the collision detecting axes on the basis of the components, then actuates them.

2. The collision detection device comprising, a plurality of passenger safety devices arranged in a vehicle, a first acceleration sensor for detecting acceleration in a front-rear direction of the vehicle, a second acceleration sensor for detecting acceleration in a left-right direction of the vehicle, collision detecting axes which are assumed as the directions in which the collision will be detected and which are respectively preset in at least such five directions as the front, right and left directions and further right oblique, left oblique directions between the front-rear direction and the left-right direction, a first calculator for arithmetically obtaining components of an acceleration concerning the collision along the said collision detecting axes on the basis of the accelerations detected by said acceleration sensors, a second calculator for obtaining referential values to integrate the components with respect to time respectively, and a comparator for comparing the referential values with threshold values respectively and for respectively transmitting actuating signals to the passenger safety devices related with the collision detecting axes when the referential values exceed the threshold values respectively.

3. The collision detection device comprising, a plurality of passenger safety devices arranged in a vehicle, a first acceleration sensor for detecting acceleration in a front-rear direction of the vehicle, a second acceleration sensor for detecting acceleration in a left-right direction of the vehicle, collision detecting axes which are assumed as the directions in which the collision will be detected and which are respectively preset in at least such five directions as the front, right and left directions and further right oblique, left oblique directions between the front-rear direction and the left-right direction, a first calculator for arithmetically obtaining components of an acceleration concerning the collision along the said collision detecting axes on the basis of the accelerations detected by said acceleration sensors, a second calculator for obtaining referential values to integrate the components with respect to time respectively, and a comparator for respectively comparing threshold values with sums of the referential values referring to components along collision detecting axes next to each other and for respectively transmitting actuating signals to the passenger safety devices related with the collision detecting axes when the referential values exceed the threshold values respectively.

4. The collision detection device as claimed in claim 2, wherein said comparator has a plurality of comparator portions for comparison and one or more of the passenger safety devices are related with the plurality of blocks and further the plurality of comparator portions are connected to the one or more of the passenger safety devices through AND or OR circuits.

* * * * *

UNITED STATES PATENT AND TRADEMARK OFFICE
CERTIFICATE OF CORRECTION

PATENT NO. : 5,900,807
DATED : May 4, 1999
INVENTOR(S) : Hiroshi MORIYAMA, et al.

It is certified that error appears in the above-identified patent and that said Letters Patent is hereby corrected as shown below:

On the title page, item [30] should be:

--[30]  Foreign Application Priority Data
   Mar. 7, 1995 [JP] Japan ................ 7-077213--

Signed and Sealed this

Eleventh Day of April, 2000

Attest:

Attesting Officer

Q. TODD DICKINSON
Director of Patents and Trademarks